(12) United States Patent
Sun

(10) Patent No.: US 8,108,358 B2
(45) Date of Patent: Jan. 31, 2012

(54) FILE MANAGEMENT METHOD OF SERVER

(75) Inventor: Yu-Liang Sun, Taipei (TW)

(73) Assignee: Inventec Corporation, Taipei (TW)

( * ) Notice: Subject to any disclaimer, the term of this patent is extended or adjusted under 35 U.S.C. 154(b) by 218 days.

(21) Appl. No.: 12/722,531

(22) Filed: Mar. 12, 2010

(65) Prior Publication Data
US 2011/0178992 A1  Jul. 21, 2011

(30) Foreign Application Priority Data
Jan. 20, 2010 (TW) ................. 99101540 A

(51) Int. Cl.
*G06F 17/00* (2006.01)

(52) U.S. Cl. ........ 707/676; 707/674; 707/781; 707/813; 707/E17.005; 711/E12.001; 711/100; 714/100

(58) Field of Classification Search .................. None
See application file for complete search history.

(56) References Cited

U.S. PATENT DOCUMENTS

| | | | |
|---|---|---|---|
| 5,778,387 A * | 7/1998 | Wilkerson et al. ........ | 1/1 |
| 7,278,068 B1 * | 10/2007 | Crowder, Jr. ........ | 714/100 |
| 7,921,082 B2 * | 4/2011 | Mukker ........ | 707/674 |
| 2003/0149752 A1 * | 8/2003 | Baldwin et al. ........ | 709/223 |
| 2005/0097260 A1 * | 5/2005 | McGovern et al. ........ | 711/100 |
| 2005/0165863 A1 * | 7/2005 | Mukker ........ | 707/202 |
| 2007/0078988 A1 * | 4/2007 | Miloushev et al. ........ | 709/227 |
| 2009/0193330 A1 * | 7/2009 | Sun ........ | 715/239 |

OTHER PUBLICATIONS

Recycle bin in linux (Linux / UNIX forum at JavaRanch, 2008.*
Ian Smith, "Using the TSM Client Command Line Interface for Backup and Restore", Apr. 2002.*
Palaniappan et al, "Efficient data transfer through zero copy zero copy, zero overhead", IBM Corporation, 2008.*

* cited by examiner

*Primary Examiner* — Hung Le
(74) *Attorney, Agent, or Firm* — CKC & Partners Co., Ltd.

(57) ABSTRACT

A file management method of a server is implemented on a Linux operating system of the server. The method includes the steps of determining if there is a file deleted; when the result is yes, searching for an actual disk block location at which the deleted file is originally located and then recovering the deleted file; moving the recovered file to a predetermined location; and changing an access privilege level of the Linux operating system.

9 Claims, 2 Drawing Sheets

FILE MANAGEMENT METHOD OF SERVER

RELATED APPLICATIONS

This application claims priority to Taiwan Application Serial Number 99101540, filed Jan. 20, 2010, which is herein incorporated by reference.

BACKGROUND

1. Field of Invention

The present invention relates to a file management method. More In particularly, the present invention relates to a file management method of a server.

2. Description of Related Art

A recycling bin mechanism used in a conventional LINUX operating system, in fact, is that, when deleting a file, a deletion program first copy the file to a file directory.

However, if a user deletes a file under a first user mode (such as a GUI (Graphic User Interface) mode) of a LINUX operating system, but intends to recover the file under a second user mode (such as a console mode) of the LINUX operating system, the deleted file cannot be used again since the user does not know the approach of the recycling bin mechanism under the first user mode and also cannot follow the approach of the recycling bin mechanism under the second user mode to obtain the location of the file directory to which the deleted file is copied.

Hence, since the approaches of various recycling bin mechanisms under a LINUX operating system are different, in order to unify the respective recycling bin mechanisms, the deletion programs thereof have to greatly modified, thus causing a lot of inconvenience and consuming a lot of manpower. Thus, it is apparent that the aforementioned recycling bin mechanisms are quite inconvenient and disadvantageous in actual applications, and need improving.

SUMMARY

An aspect of the present invention is to provide a file management method of a server for overcoming the shortcoming of not knowing the location at which a deleted file is stored under different user modes of a LINUX operating system.

Another aspect of the present invention is to provide a file management method of a server for coexisting with various recycling bin mechanisms, and thereby the deleted file can be stored to a specific location and provided for a user to reuse the deleted file, regardless of different locations at which the is deleted file is stored under the respective recycling bin mechanisms.

The file management method of a server is applicable to a LINUX operating system of the serve. The method includes a step of monitoring and determining if there is a file deleted. When it is determined that the file is deleted, a step of searching for an actual disk block location at which the file deleted is originally located is performed, and a step of recovering the file deleted is performed. Then, a step of moving the file recovered to a predetermined location is performed, and a step of changing an access privilege level of the Linux operating system is performed.

According to an embodiment of the present invention, in the step of monitoring and determining whether there is a file deleted, a file monitoring program is used to observe a plurality of files located in a user directory of the server.

According to another embodiment of the present invention, in the step of observing the files by using the file monitoring program, when a system kernel of the LINUX operating system issue an instruction signal of deleting the file, the file monitoring program notifies the LINUX operating system in accordance with the instruction signal.

According to another embodiment of the present invention, in the step of searching for the actual disk block location at which the file deleted is originally to located, the file monitoring program bases on the instruction signal to obtain the actual disk block location at which the file deleted is originally located.

According to another embodiment of the present invention, the step of recovering the file deleted further includes a step of reading out the file deleted by using a file recovery program; and a step of providing a header for the file is deleted, thereby recovering the file.

According to another embodiment of the present invention, the step of moving the file recovered to a predetermined location further includes a step of copying and moving the file recovered to a predetermined recycling bin directory.

According to another embodiment of the present invention, the step of changing the access privilege level of the Linux operating system further includes a step of changing the access privilege level of the Linux operating system from a root privilege to a user privilege, wherein the user privilege is a privilege owned by a user who deleted the file originally.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
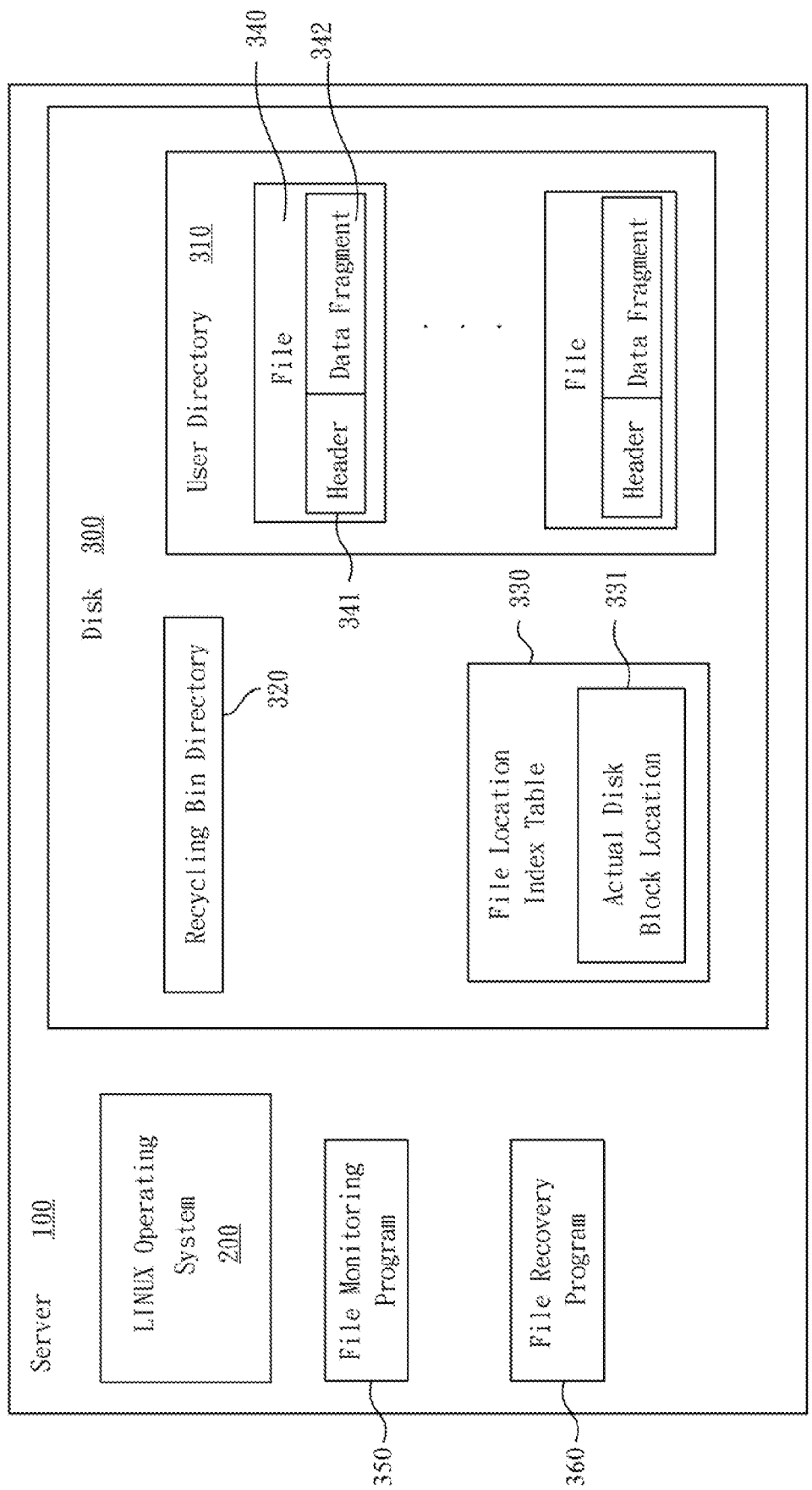
FIG. 1 is a schematic diagram showing a server performing a file management method according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, FIG. 1 is a schematic diagram showing a server performing a file management method according to an embodiment of the present invention. The file management method is applied on a server 100. The server includes at least one disk 300, and there are at least one user directory 310, a recycling bin directory 320 (such as a user-predetermined path), and a file location index table 330. The user directory 310 may record a plurality of files 340, and the file location index table 330 records the data of actual disk block locations 331 on the disk 300 at which the files 340 are located respectively Each of the files 340 has a header 341, and the header 341 records a lot of detailed data regarding the file 340. When a file 340 is "deleted", the data of the file 340 located at the actual disk block location 331 recorded in the file location index table 330 is deleted, and the header 341 of the file 340 is removed, and thus only a data fragment 342 remains.

Meanwhile, the actual disk block location 331 of the file 340 is marked as an "unused" state, and the data of the file 340 will be covered by the subsequent data and disappear. On the contrary, when the file 340 is not deleted, the actual disk block location 331 of the file 340 is marked as a "used" state, and thus the data of the file 340 will not be covered by other data.

Figure 2:
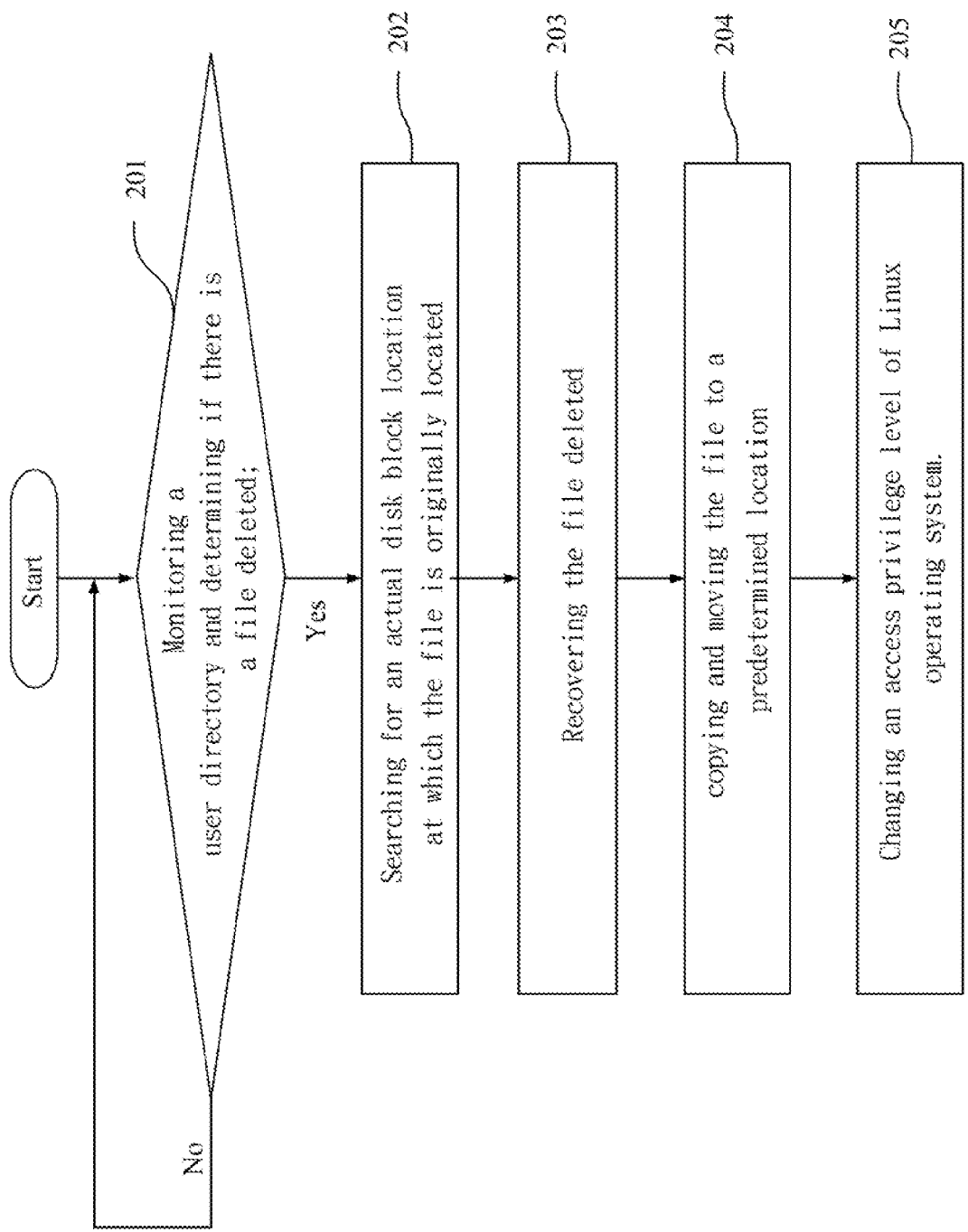
FIG. 2 is a flow chart showing the file management method according to an embodiment of the present invention.

Please refer to FIG. 1 and FIG. 2. The server 100 has loaded a LINUX operating system 200. On the LINUX operating system 200, a user may operate the server 100 under various modes (such as a GUI mode and a console mode, etc.). FIG. 2 is a flow chart showing the file management method according to an embodiment of the present invention. According to an embodiment of the file management method, the LINUX operating system 200 performs the following steps.

Step 201 is performed to monitor the user directory 310 and to determine if there is a file 340 deleted. If the result of step 201 is yes, step 202 is performed; or step 201 is returned.

In step 201, the LINUX operating system 200 uses a file monitoring program 350 (such as notify program) of the server 100 to observe each of the files 340 in the user directory 310. The file monitoring program 350 can notify the LINUX operating system 200 whenever these files have changes (such as addition, deletion or relocation, etc.).

Concretely speaking, when the user performs a step of deleting a file 340, a system kernel of the LINUX operating system 200 issues an instruction signal of deleting the file 340 accordingly. At this moment, the file monitoring program 350 can learn that the file 340 has been deleted from the instruction signal, and notify the LINUX operating system 200.

Step 202 is performed to search for the actual disk block location 331 of the disk 300 at which the file 340 is originally located.

In step 202, the file monitoring program 350 bases on the aforementioned instruction signal to obtain the actual disk block location 331 of the disk 300 at which the file 340 is originally located, thus achieving the object of the LINUX operating system 200 obtaining the actual disk block location 331 of the disk 300 at which the file 340 is originally located.

Step 203 is performed to recover the deleted file 340.

In step 203, the LINUX operating system 200 uses a file recovery program 360 (such as hack file recovery program 360) to perform recovery on the deleted file 340.

Concretely speaking, after the LINUX operating system 200 finds the deleted file 340 (i.e. the aforementioned data fragment 342), the file recovery program 360 first reads out the deleted file 340, and then provides a header 341 for the deleted file 340, thereby recovering the file 340.

Step 204 is performed to copy the file 340 to a predetermined location.

In order to collect the file 340 to be deleted to the predetermined location for allowing the user to reuse the file if necessary, the file 340 is move to a predetermined recycling bin directory, such as /home/user/trash.

Step 205 is performed to change the current access privilege level of the Linux operating system 200 from a root privilege to a user privilege.

Since the Linux operating system 200 performs the aforementioned steps under a root privilege which has the maximum privilege, the user cannot read and use the files if the access privilege level of the Linux operating system 200 is not changed to a user privilege. Therefore, the access privilege level of to the Linux operating system 200 has to be changed to the privilege owned by the user who deleted the file 340 originally.

Hence, although the approaches of various recycling bin mechanisms under a LINUX operating system are different, yet the file management method of the present invention can coexist with the respective recycling bin mechanisms. In spite of several use modes compatible under the LINUX operating system, as long as a file is deleted, the present invention is able to restore the deleted file to a specific location and provide a user with an opportunity of reusing the deleted file, regardless of different locations at which the deleted file is stored under the respective recycling bin mechanisms.

It can be known from the embodiments of the present invention that the applications thereof can advantageously allow a user to learn his/her abnormal blood sugar level risks within the respective measurement time periods; further remind the user of the specific measurement time periods within which his/her blood sugar control is poor and needs further attention; and provide a recommended diet list in accordance with the user's diet record and measured blood sugar levels, thereby satisfying the user's personal diet favorites or physical conditions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A file management method of a server, applicable to a LINUX operating system of the server, wherein the file management method of the server comprises:
   monitoring and determining if there is a file deleted;
   searching for an actual disk block location at which the file deleted is originally located and recovering the file deleted, when it is determined that the file is deleted;
   moving the file recovered to a predetermined location; and
   changing an access privilege level of the Linux operating system.

2. The file management method of the server as claimed in claim 1, wherein the step of monitoring and determining whether there is a file deleted further comprises:
   observing a plurality of files located in a user directory of the server by using a file monitoring program.

3. The file management method of the server as claimed in claim 2, wherein the step of observing the files by using the file monitoring program further comprises:
   when a system kernel of the LINUX operating system issue an instruction signal of deleting the file, the file monitoring program notifying the LINUX operating system in accordance with the instruction signal.

4. The file management method of the server as claimed in claim 3, wherein the step of searching for the actual disk block location at which the file deleted is originally located further comprises:
   the file monitoring program basing on the instruction signal to obtain the actual disk block location at which the file deleted is originally located.

5. The file management method of the server as claimed in claim 3, wherein the step of recovering the file deleted further comprises:
   reading out the file deleted by using a file recovery program; and
   providing a header for the file deleted, thereby recovering the file.

6. The file management method of the server as claimed in claim 1, wherein the step of moving the file recovered to a predetermined location further comprises:
   copying and moving the file recovered to a predetermined recycling bin directory.

7. The file management method of the server as claimed in claim 1, wherein the step of changing the access privilege level of the Linux operating system further comprises:
changing the access privilege level of the Linux operating system from a root privilege to a user privilege.

8. The file management method of the server as claimed in claim 7, wherein the user privilege is a privilege owned by a user who deleted the file originally.

9. A file management method of a server, applicable to a LINUX operating system of the server, wherein the file management method of the server comprises:
monitoring and determining if there is a file deleted, wherein a plurality of files located in a user directory of the server are observed by using a file monitoring program; and when a system kernel of the LINUX operating system issue an instruction signal of deleting the file, the file monitoring program notifies the LINUX operating system in accordance with the instruction signal;
searching for an actual disk block location at which the file deleted is originally located and recovering the file deleted, when it is determined that the file is deleted, wherein the file monitoring program bases on the instruction signal to obtain the actual disk block location at which the file deleted is originally locate, the step of recovering the file deleted further comprising:
reading out the file deleted by using a file recovery program; and
providing a header for the file deleted, thereby recovering the file;
moving the file recovered to a predetermined location, wherein the file recovered is copied and moved to a predetermined recycling bin directory; and
changing an access privilege level of the Linux operating system, wherein the access privilege level of the Linux operating system is changed from a root privilege to a user privilege, wherein the user privilege is a privilege owned by a user who deleted the file originally.

* * * * *